United States Patent
Kubota

[11] Patent Number: 5,993,228
[45] Date of Patent: Nov. 30, 1999

[54] CIRCUIT CONNECTING DEVICE OF STEERING MODULE FOR VEHICLE

[75] Inventor: Minoru Kubota, Shizuoka-ken, Japan

[73] Assignee: Yazaki Corporation, Tokyo, Japan

[21] Appl. No.: 08/812,397

[22] Filed: Mar. 5, 1997

[30]     Foreign Application Priority Data

Mar. 6, 1996   [JP]   Japan ................................ 8-049224

[51] Int. Cl.⁶ ............................................... H01R 3/00
[52] U.S. Cl. ........................................ 439/164; 439/364
[58] Field of Search ............................. 439/164, 364, 439/15

[56]           References Cited

U.S. PATENT DOCUMENTS 3,763,455  10/1973  Confer et al. .
4,975,064  12/1990  Takahashi et al. ...................... 439/164

Primary Examiner—Michael L. Gellner
Assistant Examiner—Antoine Ngandjui
Attorney, Agent, or Firm—Finnegan, Henderson, Farabow, Garrett & Dunner, L.L.P.

[57]           ABSTRACT

A circuit connecting device has a circuit connecting body constructed by a fixed body connected to a connector for a wire harness and a rotating body rotatable with respect to this fixed body and fixed onto a steering wheel side. An inner cylindrical portion inserting a steering shaft thereinto is formed in an inner circumference of this rotating body. A collar is mounted to this inner cylindrical portion and is slidable in an axial direction and a rotating movement of the collar is restricted. A relative rotation of the rotating body and the fixed body is restricted by engaging this collar and the fixed body with each other. This engagement is released by pushing-in the collar at an inserting time of the steering shaft. Accordingly, a vehicle assembly working property of a steering module can be improved.

7 Claims, 7 Drawing Sheets

CIRCUIT CONNECTING DEVICE OF STEERING MODULE FOR VEHICLE

BACKGROUND OF THE INVENTION

The present invention relates to a circuit connecting device of a steering module for a vehicle. More particularly, the present invention relates to a circuit connecting device for connecting a vehicle wire harness and a steering module intensively arranged in a steering wheel section of the vehicle.

In a conventional steering wheel, a steering module of switches, an air bag system, etc. for operating an air conditioner, an audio, an autocruise system, etc. is assembled into a steering pad of a vehicle or a peripheral portion thereof. A circuit connecting body having a reel shape is used to connect circuits of this steering module and a wire harness of the vehicle.

This circuit connecting body connects a rotating body and a fixed body to each other by a flat cable having a spiral shape and is generally called a clock spring or a cable reel. Namely, the rotating body in a central portion of the circuit connecting body is fixed to the steering wheel and a steering shaft. A connector of the fixed body is attached to a connector for the wire harness.

In such a conventional structure, the rotating body and the fixed body of the circuit connecting body are relatively rotated freely. Therefore, when the steering wheel is conveyed and the circuit connecting body is assembled into the steering shaft, the fixed body of the circuit connecting body accidentally comes in contact with something and is rotated so that a shift in position of the connector is caused and no fixed body can be fitted into a movable connector on a steering shaft side in a certain case. Accordingly, careful attention must be paid such that no fixed body is rotated, thereby causing a problem about an assembly working property.

SUMMARY OF THE INVENTION

In view of the above-mentioned points, an object of the present invention is to provide a circuit connecting device of a steering module for a vehicle in which a vehicle assembly working property of the steering module is improved by arranging a means for restricting a rotating movement of a connecting plate of a circuit connecting body.

To achieve the above object, the present invention is characterized in a circuit connecting device for connecting a steering module and a wire harness of a vehicle, the steering module arranged around a steering wheel of the vehicle, the circuit connecting device comprising: a circuit connecting body; a collar; and a spring; and wherein the circuit connecting body has a fixed body and a rotating body; the fixed body is connected to a connector for the wire harness; the rotating body is arranged rotatable with respect to the fixed body, is fixed onto a side of the steering wheel, and has an inner cylindrical portion, the inner cylindrical portion has an inner circumference where the steering shaft is inserted in; the collar is mounted to the inner cylindrical portion and is slidable in an axial direction so that a movement of the collar in its rotating direction is restricted; the collar is biased in the axial direction by the spring and is engaged with the fixed body so that a relative rotation of the fixed body and the rotating body is restricted; and the engagement of the collar and the fixed body is released by the insertion of the steering shaft.

In accordance with such a construction, the relative rotation of the fixed body is restricted by the collar until the steering module is inserted onto the steering shaft and the fixed body is connected to the connector for the wire harness. Therefore, there is no case in which no fixed body can be connected to the connector for the wire harness by a shift in position of the fixed body.

Accordingly, an assembly working property of the steering module is improved and a maintaining work can be easily made. Further, the circuit connecting device has a simple structure in which the collar and the spring are simply added to a conventional circuit connecting body.

A first concave-convex portion can be formed in the fixed body in its circumferential direction, and a stopper having a second concave-convex portion engaged with the first concave-convex portion can be formed in the collar.

In accordance with such a construction, the rotation of the fixed body is restricted by the engagement of both the concave-convex portions and the fixed body can be rotated by releasing this engagement.

Both the concave-convex portions can be engaged and disengaged by sliding and operating the collar so that such engaging and disengaging operations can be simply performed.

An outer cylindrical portion can be formed on an outer circumferential side of the inner cylindrical portion. A circumferential space portion can be formed between the inner cylindrical portion and the outer cylindrical portion such that the collar is slid in the circumferential space portion. The spring can be stored into this circumferential space portion.

In accordance with such a construction, the collar and the spring are stored into the circumferential space portion so that the collar and the spring do not prevent a rotating movement of a flat cable.

The engagement of the first concave-convex portion and the stopper can be released by pushing-in the collar by a front face plate of a column cover attaching the connector for the wire harness thereto at an inserting time of the steering shaft.

In accordance with such a construction, the collar is pushed-in by the front face plate of the column cover at an inserting time onto the steering shaft so that the engagement of the first concave-convex portion and the stopper is automatically released. Accordingly, the rotating body is freely rotated and functions as a circuit connecting body.

One of a concave groove and a rib engaged with each other can be formed in the axial direction in an outer circumference of the inner cylindrical portion, and the other of them can be formed in the axial direction in an inner circumference of the collar.

In accordance with such a construction, the collar is slid only in the axial direction by engaging the rib and the concave groove with each other so that a movement of the collar in its rotating direction is restricted.

Further, an end tip of the inner cylindrical portion can be projected from an end tip of the collar.

In accordance with such a construction, it is possible to prevent the collar from accidentally coming in contact with something and being disengaged from the connecting plate.

DESCRIPTION OF THE PREFERRED EMBODIMENTS

Figure 1:
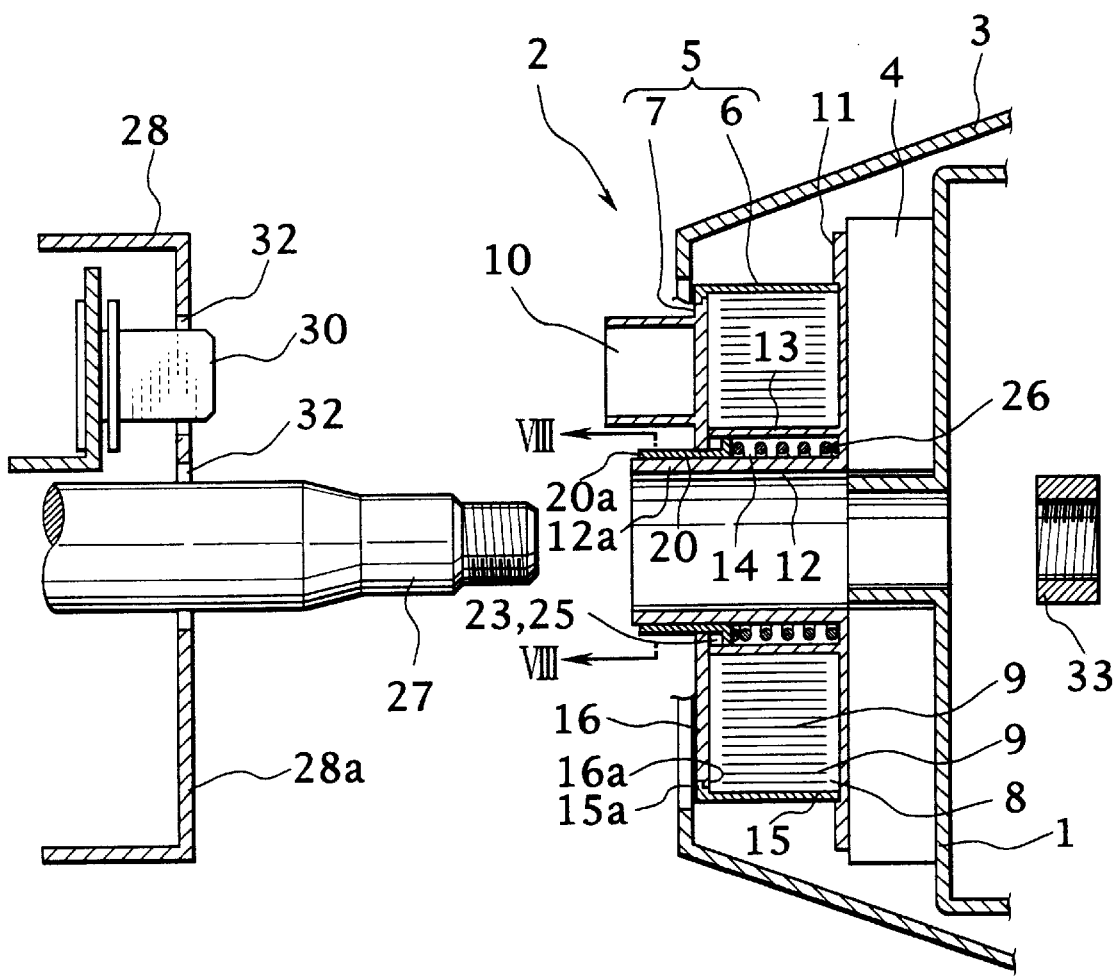
FIG. 1 is a longitudinal sectional side view showing an embodiment form of a circuit connecting device of a steering module for a vehicle in the present invention.

Embodiment forms of the present invention shown in the drawings will next be explained.

Figure 5:
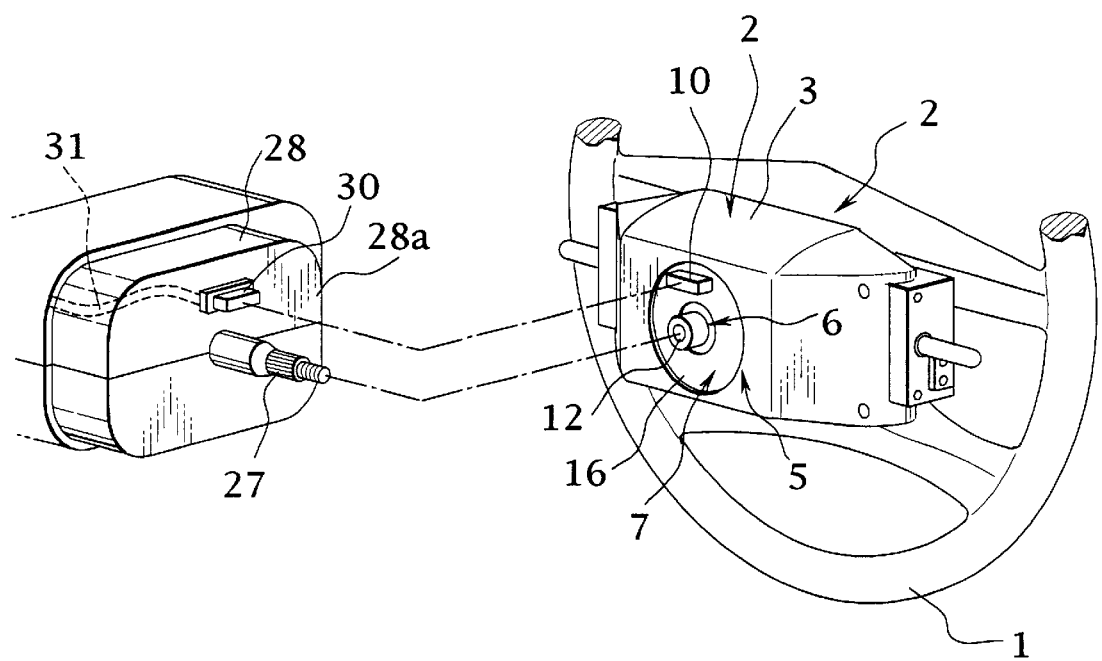
FIG. 5 is an exploded perspective view of a steering wheel and a steering shaft portion.

In FIG. 5, a steering module 2 is attached to the rear side of a steering wheel 1. This steering module 2 is constructed by a control unit 4 (see FIG. 1) arranged within a case cover 3 and a circuit connecting body 5 attached to a rear face of this control unit 4. The control unit 4 is attached to the rear side of the steering wheel 1.

A connector 30 for a wire harness is attached to a front face plate 28a of a column cover 28 arranged outside a steering shaft 27. A wire harness 31 for a vehicle is connected to this connector 30 for a wire harness. This connector 30 for a wire harness is constructed by using a well-known movable connector in which a socket portion connected to a connector as the other party can be moved in a transversal direction.

In FIG. 1, the circuit connecting body 5 is constructed by a rotating body 6 fixed to the control unit 4 and a fixed body 7 arranged such that the fixed body 7 blocks an opening portion of this rotating body 6. A flat cable 9 is inserted in a spiral shape into a space portion 8 between this rotating body 6 and the fixed body 7. One end of this flat cable 9 is connected to the control unit 4 and the other end of the flat cable 9 is connected to a connector 10.

The rotating body 6 is constructed by a bottom plate portion 11 fixed to the control unit 4, an inner cylindrical portion 12, an outer cylindrical portion 13, and an outermost cylindrical body 15 arranged on an outer circumferential side of the bottom plate portion 11. The inner cylindrical portion 12 is formed in a central portion of the bottom plate portion 11. The outer cylindrical portion 13 has a height slightly lower than that of this inner cylindrical portion 12. A circumferential space portion 14 is formed between these inner and outer cylindrical portions 12 and 13.

The fixed body 7 is constructed by a connecting plate 16 and the above connector 10 arranged in this connecting plate 16. The connecting plate 16 is arranged such that this connecting plate 16 can be relatively rotated with respect to the outermost cylindrical body 15 of the rotating body 6. A fixed side step portion 16a formed in an outer circumference of the connecting plate 16 is engaged with a rotating side step portion 15a formed in an inner circumference of the outermost cylindrical body 15 at its opening end, and an opening end face of the outer cylindrical portion 13 comes in contact with a central portion of the connecting plate 16 so that the fixed body 7 is relatively rotatably attached to the rotating body 6.

Figure 6A:
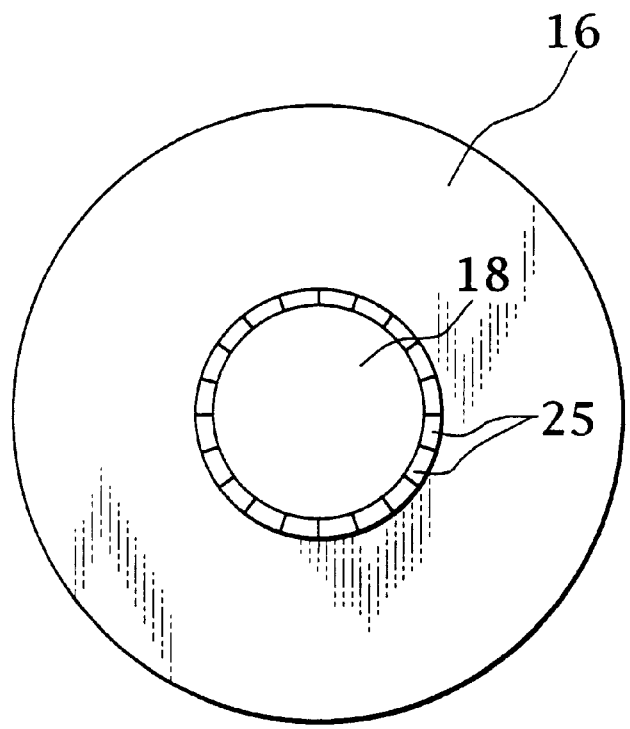
FIG. 6A is a rear view of a connecting plate.

The inside diameter of a hole 18 (see FIG. 6A) in a central portion of the connecting plate 16 is set to be slightly larger than an outside diameter of the inner cylindrical portion 12. A collar 20 is attached to an outer circumference of the inner cylindrical portion 12 and can be slid in an axial direction along an inner circumference of the hole 18.

Figure 7A:
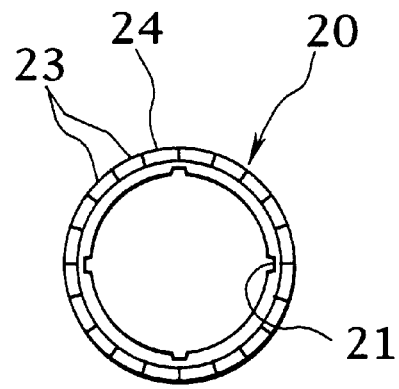
FIG. 7A is a front view of a collar.
Figure 7B:
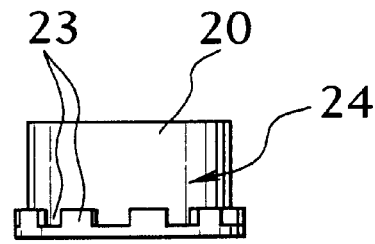
FIG. 7B is a side view of the collar.
Figure 8:
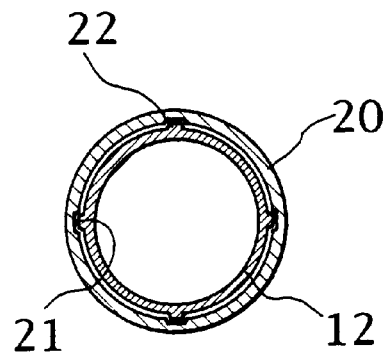
FIG. 8 is a cross-sectional view taken along line VIII—VIII of FIG. 1.

As shown in FIGS. 7A and 8, four concave grooves 21 are formed in an axial direction in respective four portions of an inner circumference of the collar 20. Ribs 22 respectively fitted to these concave grooves 21 are formed in the axial direction in an outer circumference of the inner cylindrical portion 12. Thus, the collar 20 is slid only in the axial direction and a movement of the collar 20 in its rotating direction is restricted. The concave grooves 21 may be formed in the outer circumference of the inner cylindrical portion 12 and the ribs 22 may be formed in the inner circumference of the collar 20.

Figure 6B:
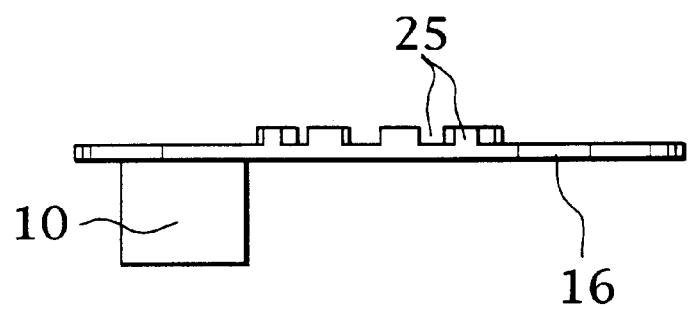
FIG. 6B is a side view of the connecting plate.

A stopper 24 having a flange shape and constructed by a second concave-convex portion 23 is formed in the outer circumference of a base portion of this collar 20. This stopper 24 faces the interior of the circumferential space portion 14. A first concave-convex portion 25 having the same shape along the inner circumference of the hole 18 is also formed on a rear face of the connecting plate 16 (see FIGS. 6A and 6B).

At this time, as shown in FIG. 1, the collar 20 is biased in a projecting direction by a spring 26 arranged within the circumferential space portion 14 so that the second concave-convex portion 23 of the collar 20 is engaged with the first concave-convex portion 25 of the connecting plate 16. Thus, the connecting plate 16 attains a state in which the connecting plate 16 is engaged with the rotating body 6. Therefore, a relative rotation of the rotating body 6 and the fixed body 7 is restricted.

An end tip 12a of the inner cylindrical portion 12 is preferably projected slightly from an end tip 20a of the collar 20. This construction is used to prevent the collar 20 from being disengaged from the connecting plate 16 when the collar 20 accidentally comes in contact with something.

The inside diameter of a hole 32 for the steering shaft 27 formed in the front face plate 28a of the column cover 28 is set to be larger than an outside diameter of the inner cylindrical portion 12 of the rotating body 6 and is set to be smaller than an outside diameter of the collar 20.

An assembly operation of the steering wheel 1 into the steering shaft 27 will next be explained with reference to FIGS. 2 to 4.

Figure 2:
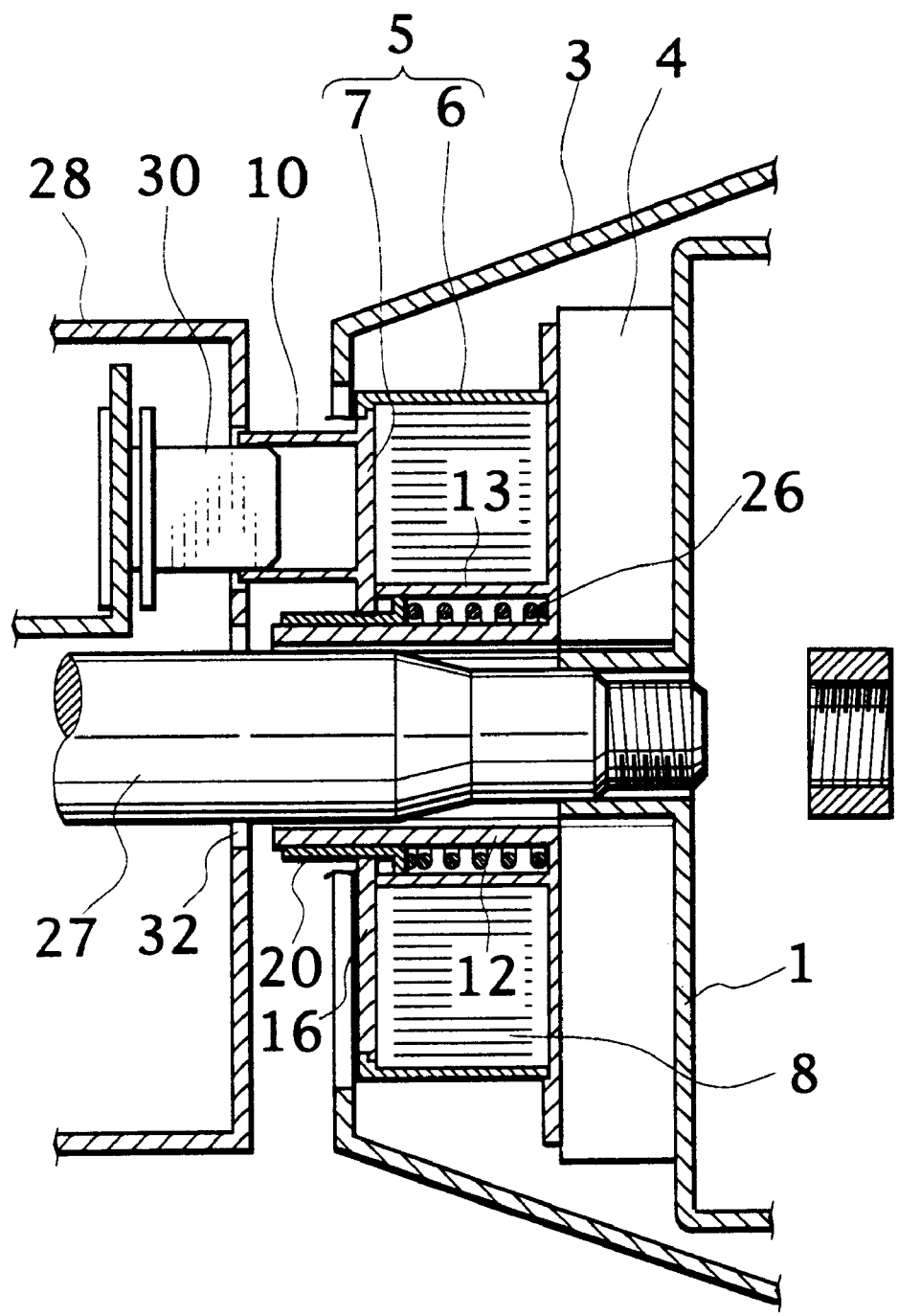
FIG. 2 is a longitudinal sectional side view showing an initial process of a steering shaft assembly of the circuit connecting device of FIG. 1.

In FIG. 2, the inner cylindrical portion 12 is inserted onto the steering shaft 27. In this case, when the circuit connecting body 5 is freely rotated, the connector 10 of the connecting plate 16 is shifted in position so that there is a fear of inconformity of this connector 10 and the connector 30 for the wire harness on a column side. However, in this embodiment form, rotation of the connecting plate 16 is restricted by engaging both the concave-convex portions 23 and 25 with each other. Accordingly, if an operator confirms only a neutral position of the steering wheel 1 and inserts the inner cylindrical portion 12 onto the steering shaft 27, the position of the connector 10 is automatically determined and is in conformity with that of the connector 30 for the wire harness.

Figure 3:
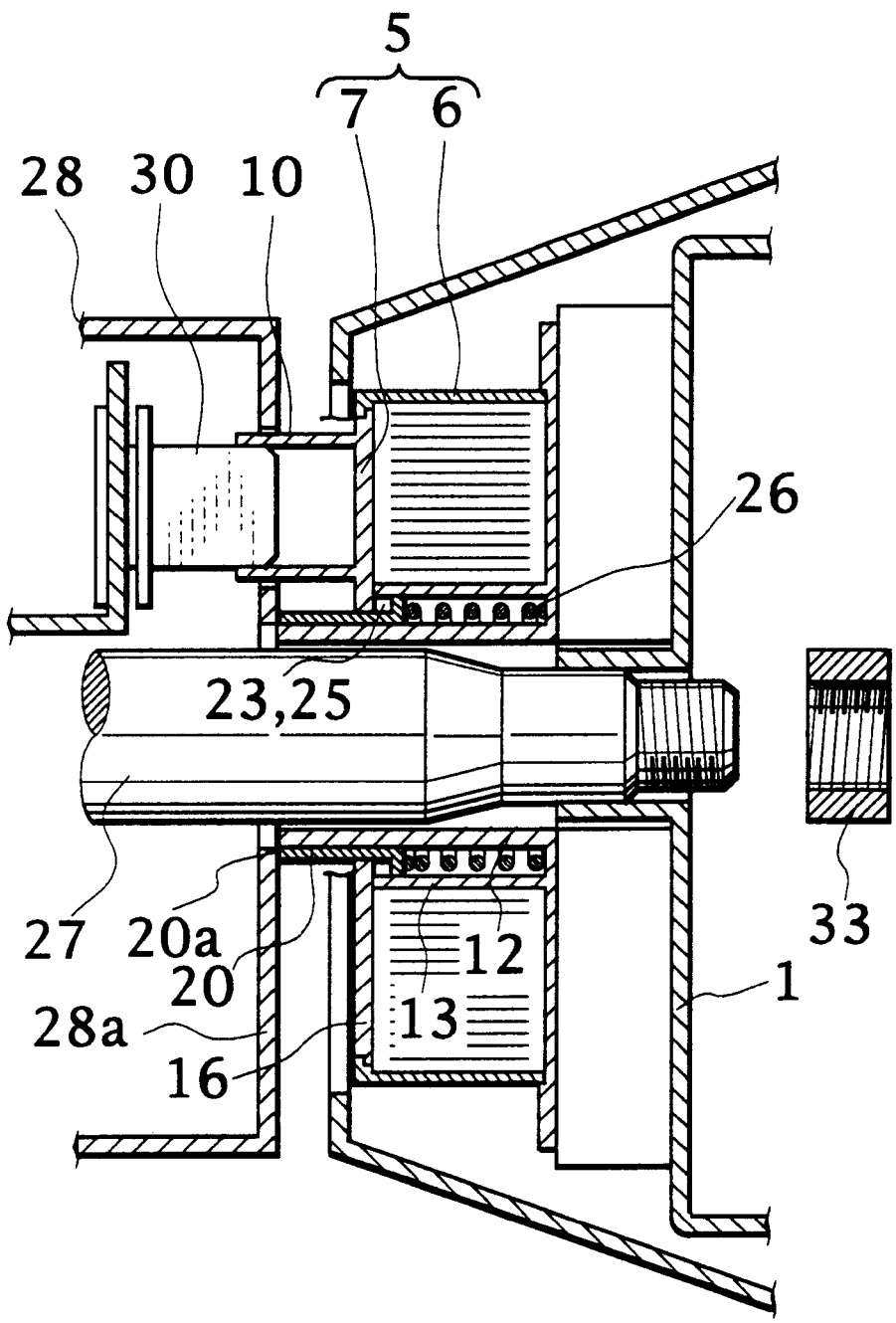
FIG. 3 is a longitudinal sectional side view showing an intermediate process of the steering shaft assembly of the circuit connecting device of FIG. 1.

FIG. 3 shows a state in which the steering wheel 1 is further advanced toward the steering shaft 27 and the end tip 20a of the collar 20 comes in contact with the front face plate 28a of the column cover 28. In this state, no engagement of both the concave-convex portions 23 and 25 is released.

Figure 4:
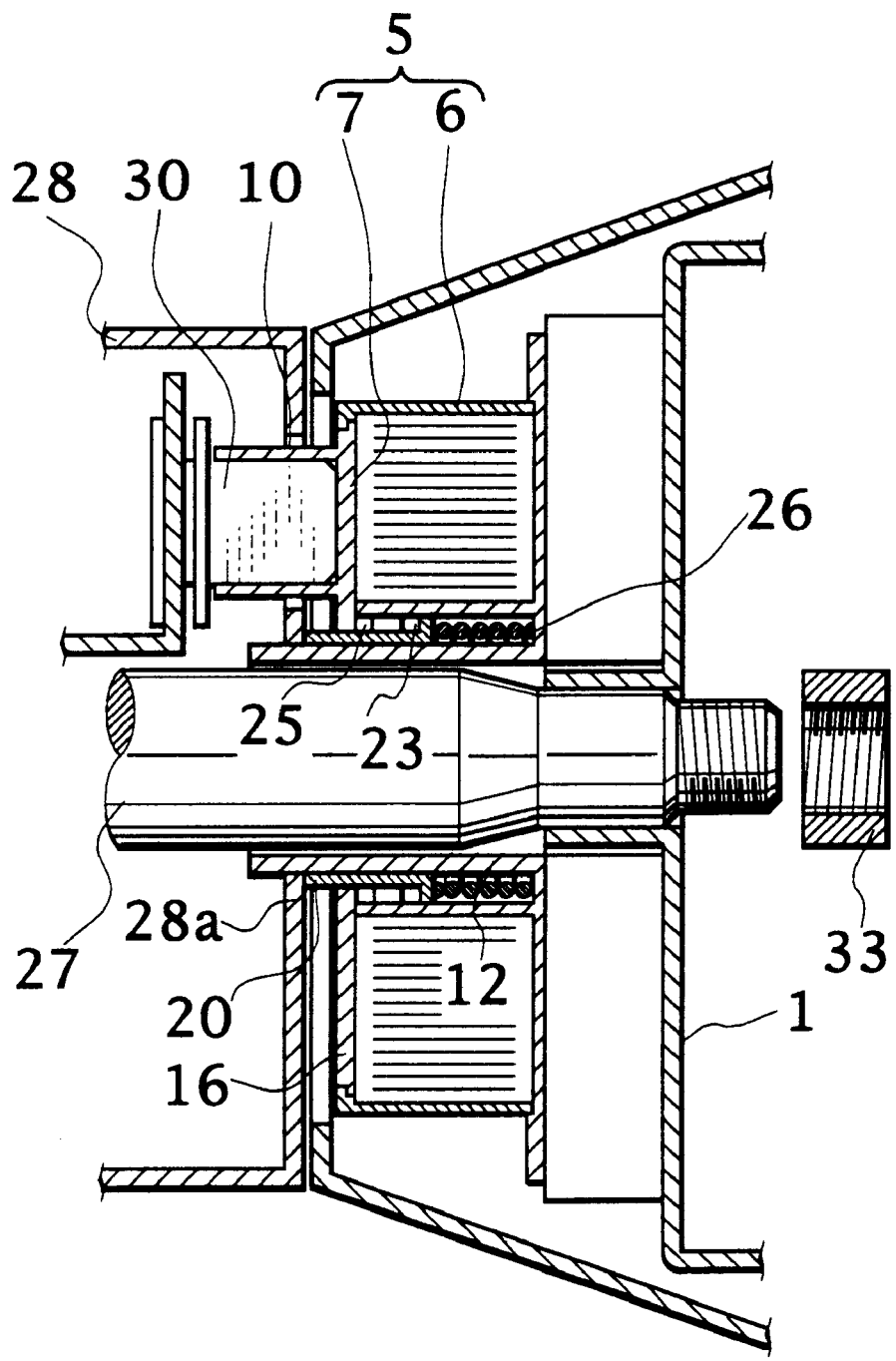
FIG. 4 is a longitudinal sectional side view showing a final process of the steering shaft assembly of the circuit connecting device of FIG. 1.

When the steering wheel 1 is slightly advanced from the state of FIG. 3, as shown in FIG. 4, the collar 20 is pressed-in by the front face plate 28a of the column cover 28 against resilient force of the spring 26 so that both the concave-convex portions 23 and 25 are disengaged from each other. At this time point, the rotating body 6 is freely rotated with respect to the fixed body 7.

In FIG. 4, a nut 33 is screwed onto the steering shaft 27 and the steering shaft 27 is fixed to the steering wheel 1 so that the assembly operation is completed.

As described above in detail, in the circuit connecting device of the steering module for a vehicle in this embodiment form, rotation of the connecting plate 16 of the fixed body 7 is restricted by the collar 20 until the steering shaft 27 is inserted and the connector 30 for the wire harness is connected to the connecting plate 16. Therefore, there is no case in which the connecting plate 16 accidentally comes in contact with something and is rotated and shifted in position so that no connecting plate 16 can be connected to the connector 30 for the wire harness.

Accordingly, if an operator conforms only the neutral position of the steering wheel and inserts the inner cylindrical portion 12 onto the steering shaft 27, the connecting plate 16 is automatically positioned so that the connecting plate 16 can be connected to the connector 30 for the wire harness.

If a center of the connecting plate 16 is shifted in position, the rotation of the connecting plate 16 can be corrected by manually sliding the collar 20.

When the steering module 2 is detached from the steering wheel at its maintaining time, both the concave-convex portions 23 and 25 are engaged with each other by the collar 20 returned by the spring 26 just before the column cover 28 is separated from the steering module 2. Accordingly, the rotation of the connecting plate 16 is restricted. Therefore, no correction of the center of the connecting plate 16 is required at the next assembly working time so that a maintaining work is easily made.

The circuit connecting device has a simple structure in which the collar 20 and the spring 26 are simply added to the conventional circuit connecting body. Accordingly, the circuit connecting device can be cheaply manufactured.

What is claimed is:

1. A circuit connecting device for connecting a steering module and a wire harness of a vehicle, the steering module arranged around a steering wheel of the vehicle, the circuit connecting device comprising:

a circuit connecting body having a fixed body and a rotating body, the fixed body being connected to a connector for a wire harness, the rotating body being rotatable arranged with respect to the fixed body, the rotating body being fixed onto a side of a steering wheel, the rotating body having an inner cylindrical portion, for a steering shaft to be inserted therein; and a collar fitted in the inner cylindrical portion, the collar being slid on the inner cylindrical portion in an axial direction, the collar being detachably engaged with the fixed body to restrict relative rotation of the fixed body and the rotating body, wherein engagement of the collar and the fixed body is released by insertion of the steering shaft.

2. The circuit connecting device as claimed in claim 1, wherein one of a concave groove and a rib engaged with each other is formed in the axial direction in an outer circumference of the inner cylindrical portion, and the other of them is formed in the axial direction in an inner circumference of the collar.

3. The circuit connecting device as claimed in claim 1, wherein an end tip of the inner cylindrical portion is projected from an end tip of the collar.

4. The circuit connecting device as claimed in claim 1, wherein a first concave-convex portion is formed in the fixed body in its circumferential direction, and a stopper having a second concave-convex portion engaged with the first concave-convex portion is formed in the collar.

5. The circuit connecting device as claimed in claim 4, wherein the engagement of the first concave-convex portion and the stopper is released by pushing-in the collar by a front face plate of a column cover attaching the connector for the wire harness thereto at an inserting time of the steering shaft.

6. The circuit connecting device as claimed in claim 1 further comprising, a spring biasing the collar in the axial direction for engagement with the fixed body.

7. The circuit connecting device as claimed in claim 6, wherein an outer cylindrical portion is formed on an outer circumferential side of the inner cylindrical portion; a circumferential space portion is formed between the inner cylindrical portion and the outer cylindrical portion such that the collar is slid in the circumferential space portion; and the spring is stored into this circumferential space portion.

* * * * *